United States Patent [19]

Kitagawa et al.

[11] Patent Number: 4,914,248

[45] Date of Patent: Apr. 3, 1990

[54] DIENE POLYMERS, PROCESS FOR PRODUCTION, THEREOF, AND RUBBER COMPOSITIONS CONTAINING SAME

[75] Inventors: Yuichi Kitagawa; Yasuo Hattori, both of Yokohama; Akira Saito, Fujisawa, all of Japan

[73] Assignee: Asahi Kasei Kogyo Kabushiki Kaisha, Osaka, Japan

[21] Appl. No.: 71,343

[22] PCT Filed: Mar. 13, 1987

[86] PCT No.: PCT/JP87/00159

§ 371 Date: Jun. 9, 1987

§ 102(e) Date: Jun. 9, 1987

[87] PCT Pub. No.: WO87/05610

PCT Pub. Date: Sep. 24, 1987

[30] Foreign Application Priority Data

Mar. 13, 1986 [JP] Japan .................. 61-53786
Mar. 13, 1986 [JP] Japan .................. 61-53787

[51] Int. Cl.⁴ .................. C08F 8/32; C08L 63/00; C08L 53/02; C08L 83/04
[52] U.S. Cl. .................. 525/113; 525/92; 525/100; 525/102; 525/103; 525/105
[58] Field of Search .................. 525/92, 113, 100, 102, 525/103, 105

[56] References Cited

U.S. PATENT DOCUMENTS 3,281,383 10/1966 Zelinski et al. .
3,926,903 12/1975 Scola .................. 525/113
4,148,771 4/1979 Nash .................. 525/314
4,397,994 8/1983 Takeuchi et al. .
4,680,341 7/1987 Newman-Evans .................. 525/113

FOREIGN PATENT DOCUMENTS 180141 5/1986 European Pat. Off. .
1162573 7/1986 Japan .

Primary Examiner—John C. Bleutge
Assistant Examiner—Susan Berman

[57] ABSTRACT

A diene polymer expressed by the following general formula and with a weight average molecular weight, determined by GPC, of 10,000 to 1,000,000:

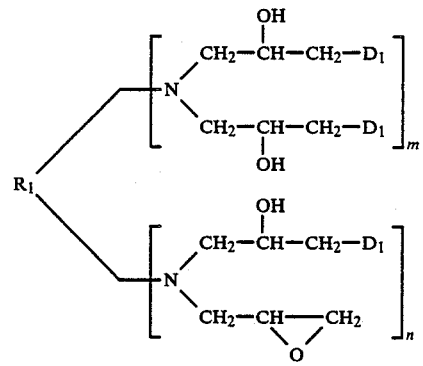

(wherein, $D_1$ indicates a diene polymer, $R_1$ an organic group of 1 to 20 carbon atoms free from active hydrogen or a silicon compound, m is 0 or an integer of from 1 to 6, and n is 0 or an integer of from 1 to 6, m being 1 or more when n=0 and n being 2 or more when m=0).

This diene polymer is used as a vulcanization use rubber composition suitable for tire applications, principally tire treads, stiffeners for high impact polystyrene, etc., thermoplastic elastomers, and thermoplastic resins.

8 Claims, No Drawings

DIENE POLYMERS, PROCESS FOR PRODUCTION, THEREOF, AND RUBBER COMPOSITIONS CONTAINING SAME

TECHNICAL FIELD

The present invention relates to coupled diene polymers having an improved processability, strength, elasticity, and other properties, which will not produce toxic, corrosive substances upon working or processing, and having superior characteristics. These diene polymers are used in general for rubber applications as conjugated diene homopolymers or random copolymers of conjugated dienes and aromatic vinyl compounds, and are suitable for use in tire applications such as tire treads with, for example, superior vulcanizate tensile strength, resilience, and heat build-up properties. Further, the diene polymers of the present invention are rubbers exhibiting a low solution viscosity in proportion to their Mooney viscosities. Accordingly, when used as a high impact polystyrene, they provide a superior high impact resistant HIPS formulation rubber with no corrosive effect on equipment. Further, when the diene polymers of the present invention are used as block copolymers of conjugated dienes and aromatic vinyls, even as a thermoplastic elastomer or as a thermoplastic resin, these polymers exhibit a superior cold flow and a well-balanced tensile strength, impact strength, and other properties.

PRIOR ART

The method of causing a reaction between a coupling agent and a diene reactive polymer polymerized in the presence of an organolithium catalyst in an organic solvent to obtain a diene polymer with increased molecular weight has been known heretofore.

For example, a method has been proposed of causing a reaction between a diene reactive polymer, and as a coupling agent, tetrachlorostannous or other polyhalogenated tin compounds (for example, see U.S. Pat. No. 3393182 (Japanese Examined Patent Publication (Kokoku) No. 44-4996)). In this method, however, breakdown of the coupled polymer and a decrease in the molecular weight easily occurred, leading to a deterioration of the polymer properties. Further, a method of causing a reaction of tetrachlorosilane or other polyhalogenated silicon compounds (for example, see U.S. Pat. No. 3,281,383 (Japanese Examined Patent Publication (Kokoku) No. 49-36957) and Japanese Unexamined Patent Publication (Kokai) No. 54-15994), also suffers from the problem of a breakdown of the coupled polymer, although not as great as with tin, and thus a decrease in the molecular weight and a deterioration of the polymer properties. Further, a 1,3,5-tri(bromomethyl)benzene or other polyhalogen-substituted hydrocarbon (for example, see Japanese Examined Patent Publication (Kokoku) No. 49-36957 and U.S. Pat. No. 3,078,254) has been proposed, but these have a low coupling efficiency and do not provide a uniform increase in molecular weight, and thus the problem of a poor performance arises. These are the problems of the prior art. The polyhalogenated compounds all include chlorine ions in the polymers, and in the finishing process, working process, and final application, and because of the halogens remaining in the polymer, are corrosive. In particular, this has a detrimental effect on iron and aluminum.

Therefore, various coupling agents other than halogen type coupling agents have been proposed. For example, the method of causing a reaction with polycarbonic acid esters such as adipic acid diothyl (for example, see U.S. Pat. No. 3,594,452 (Japanese Examined Patent Publication (Kokoku) No. 47-14132), which also suffers from a low coupling efficiency and an inferior performance of the polymer due to the lack of uniform increase of the molecular weight, and further requires the elimination of alcohol produced by the reaction. Further, a method has been proposed of causing a reaction of epoxidized liquid polybutadiene, epoxidized vegetable oil, and other polyepoxides (for example, see U.S. Pat. No. 3,281,383 (Japanese Examined Patent Publication (Kokoku) No. 49-36957)), but a uniform coupling is not obtained and the performance of the obtained polymer is unsatisfactory. In addition, polyisocyanate, polyimine, polyaldehyde, polyketone, polycarboxylic anhydride, etc., have been proposed, but these compounds are unstable and suffer from a low coupling efficiency and, therefore, cause problems in practical use.

Further, in a main field of utilization of the present invention, that of rubber for tires, the increasing motorization in Japan in recent years has led to the production of many models of automobiles. The automobile tires mounted on the same have become increasingly diversified together with the models of the automobiles, uses and applications, preferences of the users, and the like. Further, from the standpoint of energy saving, automobile tires are required to contribute to a low fuel consumption. On the other hand, from the standpoints of automobile safety and pollution prevention, the tires must have an improved in brake performance and reduced noise. Various demands are thus being made on tires from various sectors of society.

In the face of such demands, as a method of improving tire performance and for producing the optimum tire for various applications, means such as an optimization of the shape and structure of the tires, optimization of the formulation of rubber compositions used for tire treads, improvement of the polymer structure of the rubber stock used for the tire treads, and optimization of the combination of rubber stocks have been utilized.

For example, for low fuel consumption tires, a formulation composition with a relatively low addition amount of carbon black and rubber extender oil is generally used to reduce the hysteresis loss of the overall composition. Further, a method is known of using an improved rubber stock to obtain a balance between the rolling resistance performance and the wet skid resistance of the rubber composition for low fuel consumption tires. For example, Japanese Unexamined Patent Publication (Kokai) No. 57-55912, discloses a method of using a styrene-butadiene copolymer having high vinyl content and branched by a specific compound of, for example, tin. Further, in Japanese Unexamined Patent Publication (Kokai) No. 59-117514 (West German Patent No. 3315525), a method is disclosed of using a conjugated diene polymer with benzophenones added to the ends of the polymer chains.

However, when such improved polymers are used in formulation compositions with comparatively low amounts of carbon black, a good processability of the formulation is not achieved. Further, the wear resistance and tear strength when the vulcanizate is used for tire treads are poor, and the riding comfort is also poor, and thus improvements are required. If the rubber extender oil and carbon black are increased in the formulation composition, to improve these points, the problems arise of a considerable deterioration of the rolling resistance performance and an insufficient effective of an improvement of the polymer.

Further, in high performance tire applications where the steering stability and wet skid characteristics are important, generally formulation compositions with large addition amounts of carbon black and rubber extender oil are frequently used. As rubber stock for these applications, use is made of the styrene-butadiene copolymer rubbers with relatively high glass transition temperatures indicated in, for example, Japanese Unexamined Patent Publication (Kokai) No. 55-60539, Japanese Unexamined Patent Publication (Kokai) No. 57-10293, and Japanese Unexamined Patent Publication (Kokai) No. 58-1734. To facilitate formulation and kneading, in many cases an oil master batch (oil extended rubber) is used in which the extender oil is premixed. In such high performance tire applications, large amounts of rubber extender oil are used, and accordingly, in the kneading of the rubber formulation and in the extrusion process, sticking at various locations occurs, which leads to poor heat build-up properties when used for treads.

Further, recently there has been rising demand for all-season tires which can be used even on icy and snowy roads in the winter, and thus can be mounted the year round. The rubber compositions used for the tire treads in such applications must display the conventional rolling resistance performance, wet skid performance, and wear resistance, and further, low temperature steering. To obtain a balance in the performances demanded, comprehensive measures are required as to the types and formulation amounts of the rubber stock, carbon black, and rubber extender oil. In the use of conventional rubber stock, however, there are large variations in the vulcanizate properties due to the compounding agents and a wide range of variations of the formulation compositions.

OBJECT OF THE INVENTION

Under the above explained situation, the present inventors made extensive studies to resolve the above-mentioned problems, and as a result, discovered that by using the coupling reaction of specific polyfunctional compounds having diglycidylamino radicals, it was possible to achieve epochmaking improvements in performance. That is, the coupling efficiency is high and a uniform coupling becomes possible. Further, there is little breakdown of the polymer formed and there are epochal improvements in the performance as a result of the effects of the residue of the specific coupling agent. It is thus possible to obtain useful diene polymers not including toxic substances in the formed polymer. Further, in the case of formulations for tires, the inventors succeeded in obtaining useful diene polymers providing rubber compositions with an extremely well-balanced rolling resistance, wet skid resistance, wear resistance, low temperature performance, and other properties, excellent processability and operability of the rubber formulation, and suitable for tire treads.

SUMMARY OF THE INVENTION

That is, the present invention provides a diene polymer expressed by the following general formula and having a weight average molecular weight, determined by GPC, of 10,000 to 1,000,000:

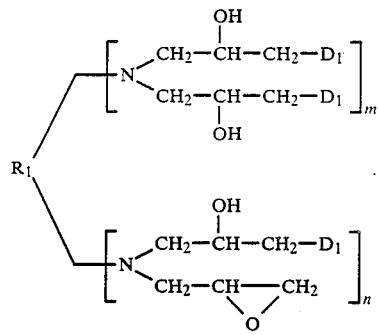

In the formula, $D_1$ indicates a diene polymer, $R_1$ an organic group of 1 to 20 carbon atoms free from active hydrogen or a silicon compound, m 0 or an integer of from 1 to 6, and n 0 or an integer of from 1 to 6, m being 1 or more when n=0 and n being 2 or more when m=0.

EXPLANATION OF EMBODIMENTS

The present invention will now be explained in further detail.

The diene polymer of the present invention is, as mentioned above, expressed by the following general formula:

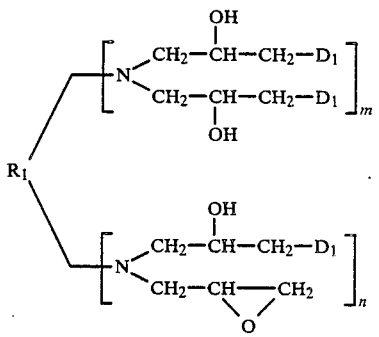

In the formula, $D_1$ indicates a diene polymer. As the monomer constituting the diene polymer, typically use may be made of a conjugated diene and, when necessary, use may be made of conjugated diene and a vinyl-substituted aromatic compound. The conjugated diene used in the present invention usually includes 4 to 12 carbon atoms per molecule, preferably 4 to 8 carbon atoms. As such a conjugated diene, for example, there can be mentioned 1,3-butadiene, isoprene, 2,3-dimethyl-1,3-butadiene, piperylene, 3-butyl-1,3-octadiene, and phenyl-1,3-butadiene. These may be used alone or in combinations of two or more. Among these conjugated dienes, 1,3-butadiene and isoprene are particularly preferable.

On the other hand, as the vinyl-substituted aromatic compound used in the present invention, there can be mentioned, for example, styrene, p-methylstyrene, α-methylstyrene, p-tertbutylstyrene, vinylnaphthalene, and 2-ethyl-4-benzylstyrene. These also may be used alone or in combinations of two or more. Among these, styrene and p-methylstyrene are particularly preferable.

In the present invention, to make the polymer a rubbery polymer, the conjugated diene should be 40 percent by weight or more of the total monomer. In particular, as a rubbery polymer suitable for tire use, it should be a homopolymer of the conjugated diene or a random copolymer of 40 percent by weight or more of the conjugated polymer and a vinyl-substituted aromatic. Further, to make the polymer a thermoplastic elastomer, it should be a block copolymer of a conjugated diene and vinyl-substituted aromatic. On the other hand, to make the polymer a thermoplastic resin, it should be a block copolymer of a conjugated diene and vinyl-substituted aromatic wherein the conjugated diene accounts for from 5 percent by weight to less than 40 percent by weight of the total monomer.

In the diene copolymer of the afore-mentioned general formula of the present invention, $R_1$ is an organic group with 1 to 20 carbon atoms free from active hydrogen or a silicon compound. As the organic group with 1 to 20 carbon atoms free from active hydrogen, there are alkyl, alkylene, cycloalkyl, aryl, allylene, and other hydrocarbon groups with 1 to 20 carbon atoms and further organic groups having 1 to 20 carbon atoms and free from active hydrogens such as —OH, —SH, —NH, etc., in the molecule. In this case, when two or more amino groups are contained in a single molecule, the distance between the amino groups is preferably within 12 carbon atoms. Specific examples of —$R_1$— are

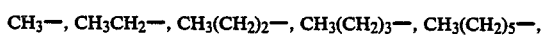

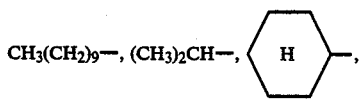

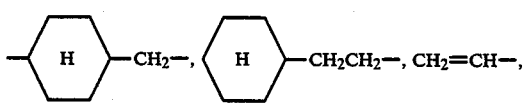

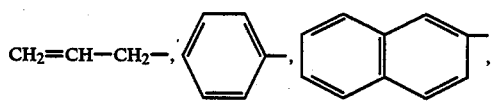

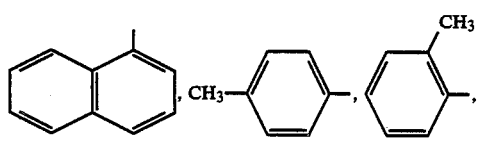

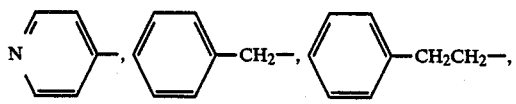

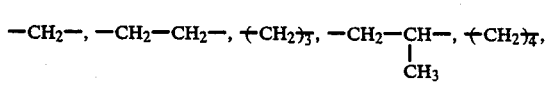

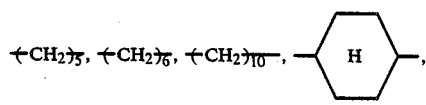

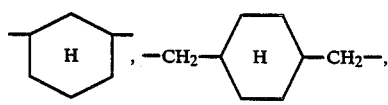

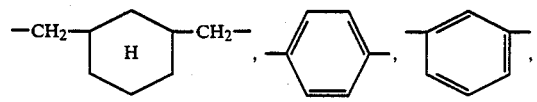

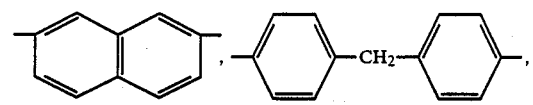

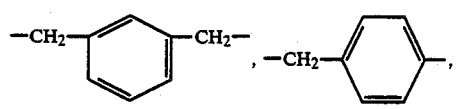

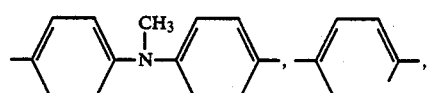

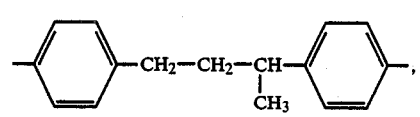

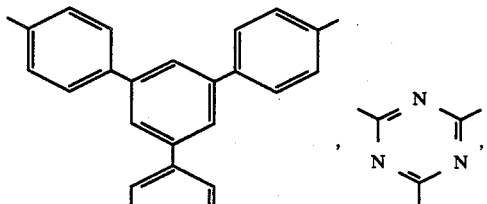

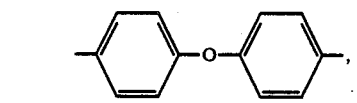

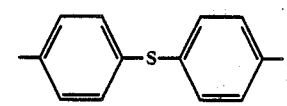

Further, as the silicon compounds, there are included, for example, alkyl-substituted silicon, alkoxy-substituted silicon, and aryl-substituted silicon, specifically:

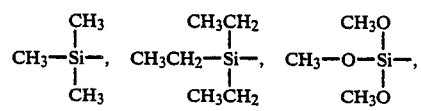

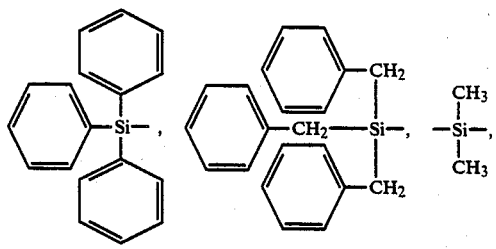

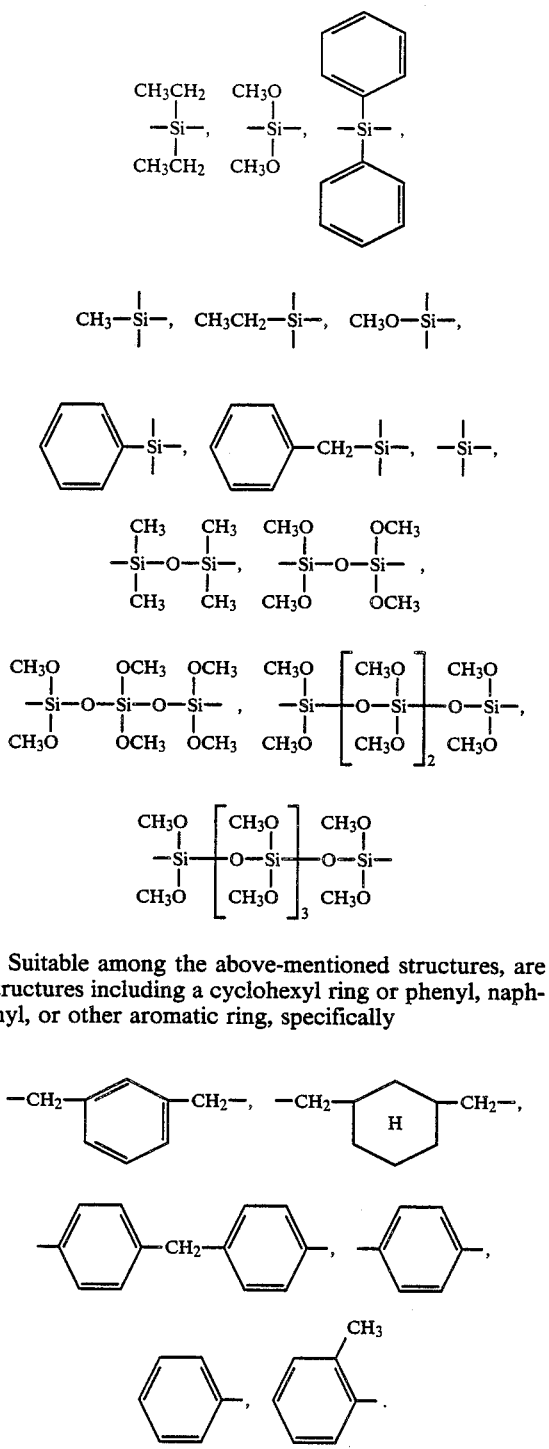

Suitable among the above-mentioned structures, are structures including a cyclohexyl ring or phenyl, naphthyl, or other aromatic ring, specifically Further, in the above-mentioned general formula, m is 0 or an integer of from 1 to 6, and n is 0 or an integer of from 1 to 6, m being 1 or more when n=0 and n being 2 or more when m=0. When m and n are other than above, the superior performance of the present invention cannot be obtained. Preferably, m+n is 1 to 3, more preferably m+n is 2.

The diene polymer of the present invention has a weight average molecular weight, determined by GPC, of 10,000 to 1,000,000, preferably 30,000 to 1,000,000. When the weight average molecular weight is less than 10,000, the strength and other properties are inferior, and thus not preferable. Conversely, when the molecular weight is too large, the polymer becomes difficult to work, and thus is also not preferable. The range of the particularly preferable weight average molecular weight differs according to the application, but for a rubbery polymer suitable for tires, is 50,000 to 1,000,000; for high impact polystyrene rubber, 50,000 to 500,000; for thermoplastic elastomers, 30,000 to 500,000; and for thermoplastic resins, 30,000 to 500,000.

Note that the molecular weights in this specification are determined by GPC (Shimadzu Corp LC-5A, columns: $10^4$, $10^5$, and $10^6$, one each, solvent: tetrahydrofuran, detector: differential refractometer) and a calibration curve found in advance from the relationship of the peak molecular weight of standard polystyrene and the count of the GPC.

The diene polymer of the present invention may be a mixture of the afore-mentioned general formula diene copolymer and a diene polymer corresponding to $D_1$ in the afore-mentioned general formula in a weight ratio of 10 to 90 to 99 to 1. In this case, if the diene polymer of the present invention is less than 10 percent by weight, the superior performance of the present invention cannot be obtained.

The diene polymer of the present invention can be obtained, for example, by coupling a diene polymer having lithium-carbon bonds, i.e., an active diene polymer, by a polyfunctional compound including diglycidylamino radicals.

As the diene polymer having a lithium-carbon bond as mentioned above, mention may be made of an active diene polymer corresponding to $D_1$ in the afore-mentioned general formula, which is polymerized using an organolithium catalyst in a hydrocarbon solvent or an active diene polymer obtained by dissolving a diene polymer corresponding to $D_1$ in a suitable solvent and causing a reaction in the solution between said diene polymer and an organolithium catalyst so as to add the lithium.

As the organolithium catalyst used in the present invention, mention may be made of hydrocarbons with at least one lithium atom bonded thereto, for example, ethyllithium, propyllithium, n-butyllithium, sec-butyllithium, tertbutyllithium, phenyllithium, propenyllithium, hexyllithium, 1,4-dilithio-n-butane, and 1,3-di(2-lithio2-hexyl)benzene, etc. Particularly preferable are n-butyllithium and sec-butyllithium. The organolithium catalyst used may be of one type or a mixture of two types or more. The amount of organolithium catalyst depends on the desired molecular weight of the produced polymer, but usually is 0.1 to 5 millimoles per 100 g monomer, preferably 0.3 to 3 millimoles.

As the hydrocarbon solvents used for the polymerization in the present invention, mention may be made of n-butane, n-pentane, iso-pentane, n-hexane, n-heptane, iso-octane, cyclohexane, methylcyclopentane, benzene, and toluene, etc. Particularly preferable solvents are n-hexane, n-heptane, and cyclohexane. These hydrocarbon solvents may be used singly or in mixtures of two or more. Usually, in an amount of 1 to 20 parts by weight per part of the monomer.

The polyfunctional compound including the diglycidylamino radicals used in the present invention is a compound expressed by the following general formula:

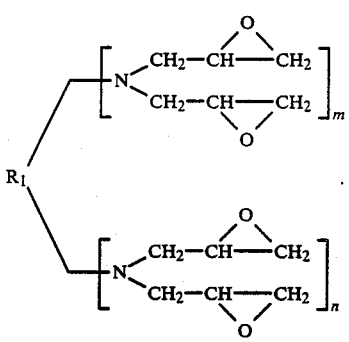

In the formula, $R_1$ is an organic group with 1 to 20 carbon atoms free from active hydrogen or a silicon compound. As the organic group with 1 to 20 carbon atoms free from active hydrogen, there are alkyl, alkylene, cycloalkyl, aryl, allylene, etc., and other organic groups free from active hydrogens such as —OH, —SH, —NH, etc., in the molecule. In this case, when two or more amino groups are contained in a single molecule, the distance between the amino groups is preferably within 12 carbon atoms. As specific examples of —$R_1$—, mention may be made of:

$CH_3$—, $CH_3CH_2$—, $CH_3(CH_2)_2$—, $CH_3(CH_2)_3$—, $CH_3(CH_2)_5$—, $CH_3(CH_2)_9$—, $(CH_3)_2CH$—, 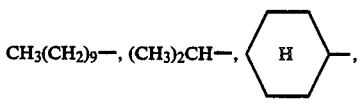

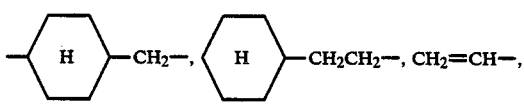, $CH_2$=$CH$—, $CH_2$=$CH$—$CH_2$—, 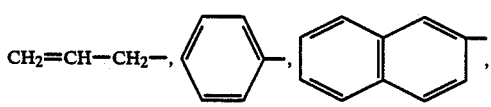

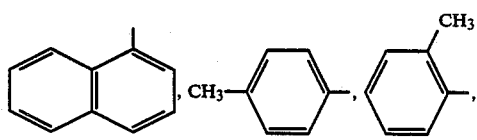

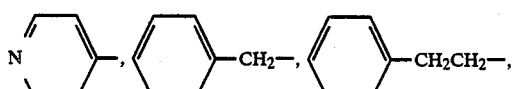

—$CH_2$—, —$CH_2$—$CH_2$—, $(CH_2)_3$, —$CH_2$—$CH$—, $(CH_2)_4$,
$\phantom{-CH_2-, -CH_2-CH_2-, (CH_2)_3, -CH_2-}$|
$\phantom{-CH_2-, -CH_2-CH_2-, (CH_2)_3, -CH_2-}CH_3$ $(CH_2)_5$, $(CH_2)_6$, $(CH_2)_{10}$, 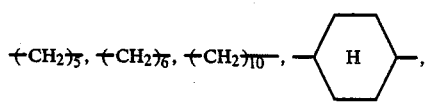

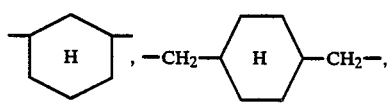

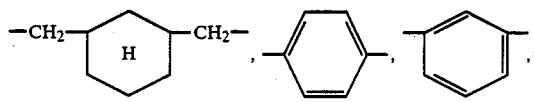

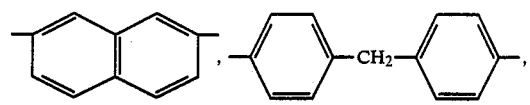

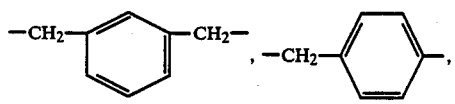

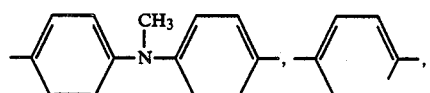

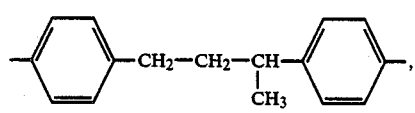

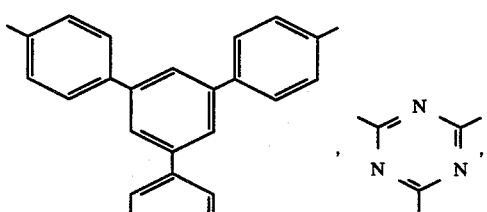

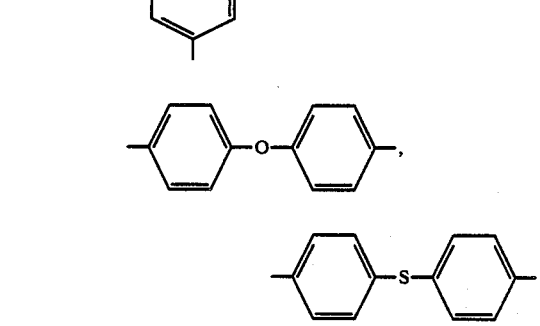

Further, as the silicon compounds, there are included alkyl-substituted silicon, alkoxy-substituted silicon, and aryl-substituted silicon, specifically:

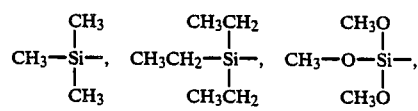

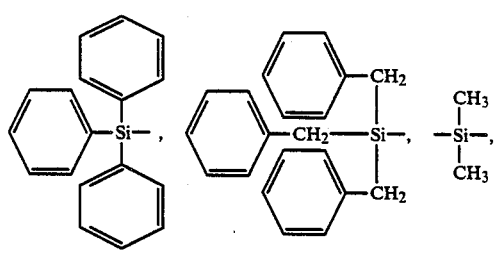

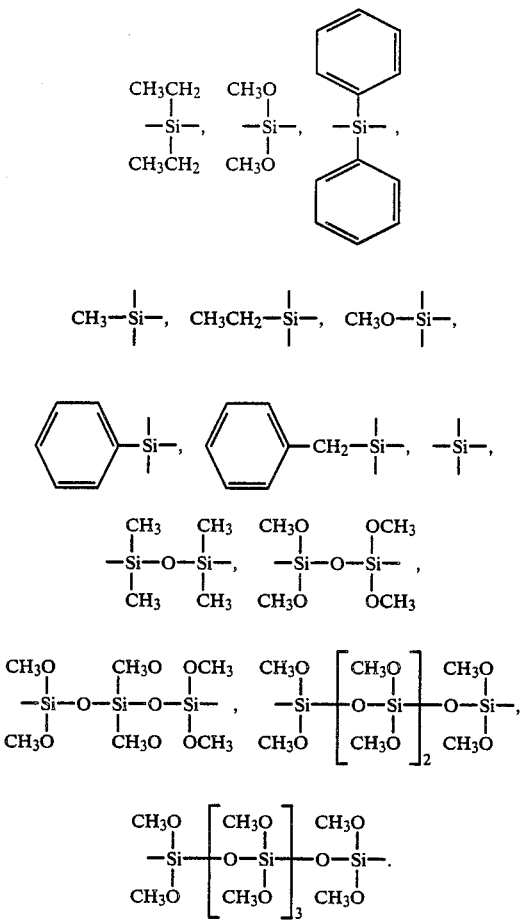

Suitable among the above-mentioned structures, are structures including a cyclohexyl ring or phenyl, naphthyl, or other aromatic ring, specifically

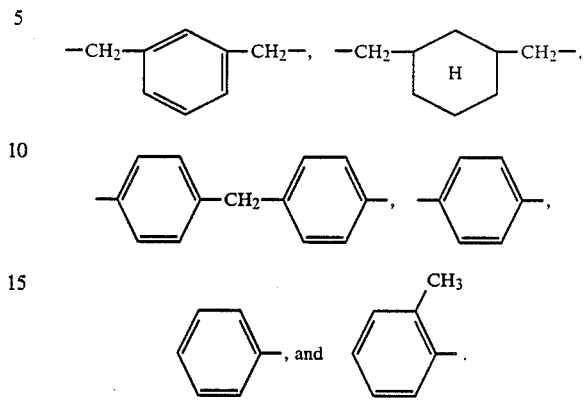

Further, in the above-mentioned general formula, m is 0 or an integer of from 1 to 6, and n is 0 or an integer of from 1 to 6, m being 1 or more when n=0 and n being 2 or more when m=0. When m and n are other than this, the superior performance of the present invention cannot be obtained. Preferably, m+n is 1 to 3, more preferably m+n is 2.

When compounds other than the above-mentioned specific polyfunctional compounds are used, the reaction rate of the polymer active lithium ends and the polyfunctional compound is low, and therefore, a uniform coupling is not achieved, or the chains of the coupled polymers are easily broken. A diene polymer having the superior characteristics of improved processability, strength, elasticity, etc., of the present invention cannot be obtained.

As the polyfunctional compound used in the present invention, specifically, mention may be made of tetraglycidylmetaxylenediamine having the following chemical structural formula:

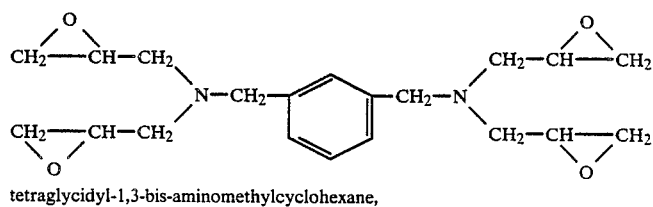
tetraglycidyl-1,3-bis-aminomethylcyclohexane,

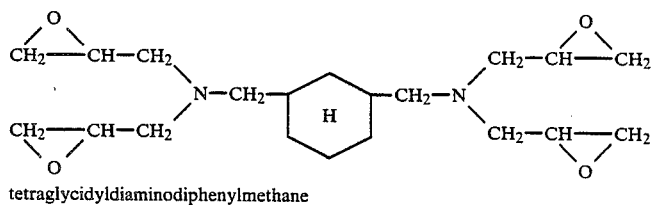
tetraglycidyldiaminodiphenylmethane

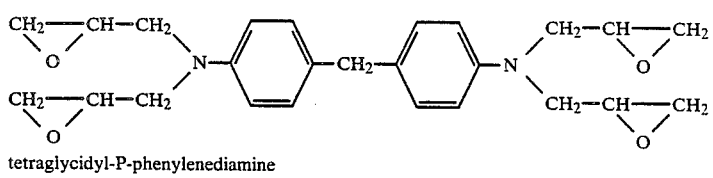
tetraglycidyl-P-phenylenediamine

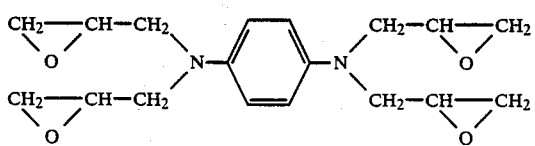
diglycidylaniline, and

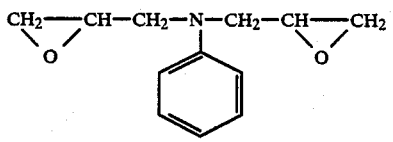
diglycidylorthotoluidine

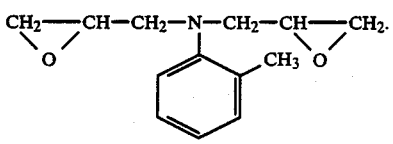

According to the present invention, these specific polyfunctional compounds are caused to react with active diene polymers to obtain coupled diene polymers. At this time, a reaction is caused between 0.1 to 5 equivalents of said polyfunctional compounds with respect to 1 mole of active diene polymer, preferably 0.5 to 1.5 equivalents, more preferably 0.75 to 1.2 equivalents. The coupling agent, when outside this range, either lower or higher, increases the linear polymers, and thus a diene polymer having a balanced processability and strength, characteristics of the present invention, cannot be obtained.

The reaction between the active diene polymer and said specific polyfunctional compounds in the present invention is extremely fast. The reaction temperature is in general from room temperature to the maximum polymerization temperature, specifically 180° C. or less, and the reaction time is from several seconds to several hours. The ratio of the molecular weight before and after the coupling reaction of the diene polymer of the present invention is 1.2 or more, preferably 1.4 or more. On the other hand, the maximum value of the ratio of molecular weights before and after the coupling reaction depends on the: degree of function of the coupling agent used, that is, the number of glycidyl radicals in the molecule, for example, 4 when using a tetrafunctional coupling agent. Note that, in this case, the molecular weight means the weight average molecular weight determined by GPC, as mentioned earlier. With a ratio of molecular weights before and after coupling of less than 1.2, a diene polymer having a balanced processability and strength, a characteristic of the present invention, cannot be obtained.

The distribution of the molecular weight of the diene polymer of the present invention is preferably within a range of $\overline{Mw}/\overline{Mn}$ of 1 to 3, but more preferably, differs according to the application of the diene polymer. For tires and high impact polystyrene, Mw/Mn should be 1.4 to 2.8. For thermoplastic elastomers and thermoplastic resins, it should be 1.1 to 1.8. When the molecular weight distribution is wider than this range, the strength and other physical properties are inferior; in particular, for tire use, the wear resistance and heat build-up properties are inferior. When narrower than the above-mentioned range, the processability is inferior.

In the present invention, the coupling reaction between the active diene polymer and the polyfunctional compound may be by the batch manner or continuous, i.e., can be suitably selected according to purpose. In the case of batch reactions, batch polymerization is performed and the coupling agent fed into the polymerization vessel to cause the reaction, or else a mixer is attached at a midway point in the transport from the bottom of the polymerization vessel by pipe, and the coupling agent fed thereto and mixed to cause the reaction. In this case; the mixer may be a vessel mounted with a rotary type mixing machine or may be a static mixer. In the case of continuous reactions, a single polymerization vessel or a plurality of polymerization vessels are connected in series to form a system by which continuous polymerization is performed, then the polymer is introduced into a further single mixer-equipped reaction vessel for continuous reaction with the polyfunctional compound, or a mixer is attached at a midway point of the transport by pipe for mixing with the polyfunctional compound and reaction.

According to the present invention, after the coupling reaction, usually an antioxidant is added to the organic solvent solution of the produced polymer, oil extension is performed according to need, the solvent removed by a usual method, and the polymer shaped into bells, clams, or pellets according to application.

Among the polymers of the present invention, the diene polymer particularly suitable for tire applications is polybutadiene or a butadiene-styrene random copolymer with a ratio of butadiene in the total monomer of 50 percent by weight of more. Particularly preferable is butadiene-styrene random copolymer with a ratio of butadiene of 60 percent by weight to 90 percent by weight. If the ratio of butadiene in the polymer is small, the heat build-up properties of the vulcanized rubber become large. On the other hand, if the butadiene ratio is too large, the tensile strength is decreased.

The chain distribution of the styrene, which is a yardstick of the randomness of the butadiene-styrene random copolymer, is analyzed by gel permeation chromatography of the low temperature ozone decomposed products of the copolymer (method by Tanaka et al, Macromolecules, 1983, 16, 1925). Preferably, the long-chain block styrene, that is, the styrene with chains of 8 or more styrene units, is 20 percent by weight or less of the total styrene, more preferably the long-chain styrene block is 15 percent by weight or less of the total styrene and the homostyrene is 40 percent by weight or more of the total bonded styrene. If the long-chain block styrene is too great or the homostyrene too little, the heat build-up properties and the resilience are decreased, and thus is not preferable. In the present invention, as the method for the copolymerizing the styrene and butadiene to obtain the random copolymer, the method of U.S. Pat. No. 4,547,560 or the method of Japanese Unexamined Patent Publication (Kokai) No. 59-140211 are particularly preferable.

For a diene polymer suitable for tire applications, the polymer before coupling preferably has a Mooney viscosity (($ML_{1+4}$ (100° C.)) of 10 to 100. When low, the tensile strength, heat build-up properties, and resilience decline, and when high, the processability is reduced, and thus not preferable. Particularly preferable is a value of 20 or more. Further, for the diene polymer, the polymer after coupling, as a non-oil-extended polymer, preferably has a Mooney viscosity of 40 to 90, more preferably 60 to 90, and as an oil-extended polymer, preferably has a Mooney viscosity after oil extension of 30 to 90 and a Mooney viscosity of the polymer after coupling (($ML_{1+4}$ (100° C.)) of 90 percent or more, more preferably 100 or more. When the heat build-up properties are particularly emphasized, the Mooney viscosity before the coupling reaction is preferably 40 or more and the Mooney viscosity after the coupling reaction 130 or more. When the Mooney viscosity after the coupling reaction is low, the tensile strength, heat build-up properties, and resilience drop, and when the Mooney viscosity after coupling is too high, the processability decreases, which are not preferable.

The diene polymer is processed by methods usually used for tire applications, either along or as a blend with other rubber, and is formulated with carbon black and a vulcanizer, and vulcanized. At this time, the polymer type polymer of the present invention must be contained in an amount of 10 percent by weight or more in the rubber stock. The vulcanization rubber composition using 10 percent by weight or more of the diene polymer of the present invention, preferably 40 percent by weight or more, formulated with carbon black is resistant to breaking of the coupled polymer chains of the present invention, and thus has a superior processability, and tensile strength, resilience, and heat build-up properties, after vulcanization.

In a preferred embodiment of the present invention, the rubber composition suitable for tire treads includes 40 percent by weight or more of the diene polymer of the present invention in the rubber stock, that diene polymer being a rubbery polybutadiene or rubbery styrenebutadiene copolymer with an $\overline{Mw}/\overline{Mn}$ of 1.4 to 3.0 and a weight average molecular weight of 50,000 to 1,000,000, and includes, as a reinforcing carbon black, 60 to 150 parts by weight, per 100 parts of the rubber stock, of carbon black having an iodine adsorption of 80 mg/g or more and DBP oil adsorption of 100 ml/100 g or more, but includes a rubber extender oil and vulcanizing agent and is a rubber composition suitable for tire treads.

In this case, further preferably, (1) the diene polymer of the present invention is a rubbery styrenebutadiene random copolymer, which is a random styrenebutadiene copolymer in which the styrene and butadiene are copolymerized in a hydrocarbon solvent using an organolithium catalyst, which has a Mooney viscosity ($ML_{1+4}$, I) of 20 to 100, and which has active ends, and which includes branch-like components obtained by causing a coupling reaction with a polyfunctional compound having two diglycidylamino radicals in a molecule, the Mooney viscosity after the coupling reaction ($ML_{1+4}$, I) being 60 or more, the ratio of the Mooney viscosity before the coupling ($ML_{1+4}$, I) and the Mooney viscosity after the coupling ($ML_{1+4}$, I) ($ML_{1+4}$, C/$ML_{1+4}$, I) being 1.2 or more, the styrene content being 5 to 50 percent by weight, and the vinyl bonds of the butadiene portion being 40 percent or less, and (2) the remaining rubber stock is a rubber composition selected from one or more of styrene-butadiene copolymer rubbers other than those mentioned above, for example, styrene-butadiene copolymer rubber obtained by the emulsion polymerization method, polybutadiene rubber, natural rubber, and polyisoprene rubber.

When the Mooney viscosity before the coupling is less than 20, the heat build-up properties and resilience of the obtained rubber composition deteriorates, and when the Mooney viscosity before the coupling reaction is over 100, although the vulcanizate properties are good, extrusion becomes difficult.

It is further preferable that the ratio of the Mooney viscosity before the coupling and the Mooney viscosity after the coupling ($ML_{1+4}$, C/$ML_{1+4}$, I) be 1.3 or more. When this ratio is less than 1.2, there are few branching components and the effect of an improvement of the processability is slight. This ratio can be adjusted by the molar ratio with the couplings to be reacted with the active ends. As mentioned earlier, when rubbery polymers with a high Mooney viscosity are produced and worked industrially, in general a rubber extender oil is added to facilitate the work. In the specific rubbery polymer of the present invention, however, when the Mooney viscosity after coupling reaction is 80 or more, it is preferable from the standpoint of the processability of the rubber formulation to set the Mooney viscosity ($ML_{1+4}$, OE) of the oil-extended rubber, to which 37.5 to 50 parts by weight to 100 parts of the rubbery polymer of an aromatic type rubber extender oil have been added, in the range of from 35 to 75.

The styrene content of the specific styrenebutadiene random copolymer preferably used in the present invention is in the range of from 5 to 50 percent by weight. When the styrene content is less than 5 percent by weight, the tensile strength is too low and when it is over 50 percent by weight, the low temperature performance deteriorates and, further, hardness tends to be too high, and thus are not preferable. The styrene content is further preferably from 15 to 40 percent by weight.

The vinyl bonds of the butadiene portion of the specific styrene-butadiene random copolymer preferably used in the present invention are 40 percent or more. When the vinyl bonds of the butadiene portion are over 40 percent, the wear resistance in particular tends to deteriorate, and thus is not preferable.

In the styrene-butadiene copolymer rubber, the glass transition temperature, which has a large effect on the stickiness among the vulcanizate properties, can be adjusted by changing the styrene content of the copolymer and the vinyl bonds of the butadiene portion. For tire treads, use is made of rubber stock with differing glass transition temperatures according to the performance required for the tires. The glass transition temperature of the specific styrene-butadiene random copolymer rubber used in the present invention is preferably in the range of from −85° to −30° C. Note that the preferable range of the glass transition temperature changes also by the combination of the other rubber stock components simultaneously used. In general, for high performance tire applications where the wet skid resistance and the steering stability are important, use is made of a rubber stock with a higher glass transition temperature. For tire applications where emphasis is on wear resistance and low temperature performance, the tendency is to use a rubber stock with a relatively low glass transition temperature.

As mentioned above, the styrene content in the copolymer can be adjusted by changing the ratio of composition of the styrene and butadiene in the case of adjusting copolymer rubber. Further, the vinyl bonds of the butadiene portion can be adjusted by adding polar compounds such as ethers and amines.

The above-mentioned rubber composition preferably is used with 60 to 150 parts by weight of reinforcing carbon black, per 100 parts of rubber stock, this being furnace carbon black with an iodine adsorption of 80 mg/g or more and a dibutylphthalate oil adsorption of 100 ml/100 g or more. As carbon blacks satisfying this limitation, there are carbon blacks with relatively small particle sizes and high reinforcing characteristics corresponding to SAF, ISAF, IISAF, and HAF class furnace carbon black. It is preferable to select a modified type of carbon black with a high structure from the viewpoint of, for example, the wear resistance, mechanical strength of the obtained vulcanized rubber composition.

If the amount compounded of the reinforcing carbon black is less than 60 parts by weight, the tear strength of the formulation is poor and if over 150 parts by weight, the resistance to heat build-up tends to deteriorate considerably. The amount compounded of the reinforcing carbon black is particularly preferably in the range of from 65 to 100 parts by weight in terms of the balance in the rolling resistance performance, the wet skid resistance performance, and the wear resistance.

In the afore-mentioned rubber composition, the rubber extender oil is used in an amount of 20 to 100 parts by weight per 100 parts of the rubber stock. The rubber extender oil is added to improve the processability of the rubber formulation and to improve the diffusion of the carbon black and is further used, along with the above-mentioned reinforcing carbon black, to adjust the hardness of the obtained rubber composition. In the present invention, it is preferable to use as the rubber extender oil an aromatic type rubber extender oil, but for applications for improving the low temperature performance etc., it is also possible to use a naphthene or paraffin type rubber extender oil.

If the amount of the rubber extender oil is less than 20 parts by weight, the effect of improvement of the processability is slight. On the other hand, if it exceeds 100 parts by weight, the stickiness of the formulation becomes strong and the workability during tire molding deteriorates.

A typical vulcanizing agent used in the composition of the present invention is sulfur. In addition, use may be made of peroxides and sulfur donor substances. These vulcanizing agents are used in amounts of 0.1 to 3.0 parts by weight to 100 parts of rubber stock.

As the rubber chemicals used in the rubber composition, there are vulcanization aids such as stearic acid, sulfenamide, quanidine, thiuram, and other vulcanization accelerators, zinc oxide, antidegradants, processing aids, crack preventers, and numerous other formulations. These can be used so far as they do not obstruct the attainment of the object of the present invention.

The rubber composition of the present invention is milled by a rubber milling roll, internal mixer, extruder, or other rubber mill, shaped and assembled, and then vulcanized at a temperature of 130° to 200° C. following ordinary methods to prepare it for use.

The rubber composition of the present invention is suitable for tire applications and further, utilizing its features of processability and vulcanizate properties, also can be used for antivibration rubber, belts, and other industrial components, automobile parts, etc.

In the present invention, in particular for applications for modification of plastics, a suitable diene type polymer for high impact polystyrene rubber is polybutadiene or a butadiene-styrene copolymer with a ratio of polybutadiene of 50 percent by weight or more in the total monomer. If the ratio of butadiene is too low, the SV becomes too low, the particle size of the rubber in the HIPS becomes too small, and the impact resistance becomes inferior. The relationship between the Mooney viscosity ($ML_{1+4}$ (100° C.)) of the diene polymer and SV is preferably (1) an $ML_{1+4}$ (100° C.) of 20 to 90 and (2) an SV of 10 to 180. The diene polymer is manufactured according to the process for production of usual high impact polystyrene. At that time, it is particularly preferable that the particle size of the rubber in the high impact polystyrene be 0.5 to 2 microns. When the rubbery polymer of the present invention is used for high impact polystyrene, the maximum impact resistance can be given by a small amount of rubber and, further, there is no corrosion of the apparatus, so a superior impact resistant polystyrene can be given. Further, the rubbery polymer of the present invention can be suitably used also as a butadiene component of ABS (acrylonitrile butadiene styrene terpolymer).

In the present invention, in particular, the diene polymer suitable as a thermoplastic elastomer is preferably a butadiene-styrene block copolymer having a ratio of butadiene to total monomer of 40 to 95 percent by weight. It is comprised of a polymer block composed principally of styrene and a polymer block composed principally of butadiene and has the structure of the general formula:

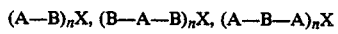

$$(A-B)_nX, (B-A-B)_nX, (A-B-A)_nX$$

(wherein, A is a polymer block composed principally of styrene, and B is a polymer block composed principally of butadiene, the boundary between the A block and B block not necessarily having to be clearly distinguished, n is the functional number of the coupling agent, that is, the number of glycidyl radicals, being an integer of 2 or more, and x is a coupling agent residue). The "polymer block composed principally of styrene" means a copolymer block of styrene and butadiene containing 50 percent by weight of styrene or a styrene homopolymer block, while the "polymer block composed principally of butadiene" means a copolymer block of butadiene and styrene containing over 50 percent by weight of butadiene or a butadiene homopolymer block. The styrene in the copolymer block may be distributed homogeneously or may be distributed in a tapered fashion.

The diene polymer suitable as a thermoplastic elastomer is used singly or as a formulation with oil or a filler for shoe soles, toy parts, antivibration materials, adhesives, and other applications or as a modifier of asphalt blends, polystyrene blends. At this time, use of the polymer of the present invention enables a high ratio of coupled polymer chains and, further, resistance to scission of the coupled polymer chains, resulting in an excellent processability, low reduction of physical properties during processing, and excellent strength and other properties of the obtained product.

In the present invention, as a diene polymer particularly suitable as a thermoplastic resin, particularly a diene polymer suitable as a transparent, impact resistant resin, a butadiene-styrene block copolymer preferably has a ratio of butadiene of from 5 percent by weight to less than 40 percent by weight of the total monomer which is comprised of a polymer block composed principally of styrene and a polymer block composed principally of butadiene and has the structure of the general formula:

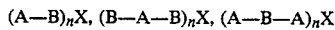

(wherein, A is a polymer block composed principally of styrene, and B is a polymer block composed principally of butadiene, the boundary between the A block and B block not necessarily having to be clearly distinguished, n is the functional number of the coupling agents, that is, the number of glycidyl radicals, being an integer of 2 or more, and X is a coupling agent residue).

This diene polymer suitable as a thermoplastic resin is used singly or as a polystyrene blend, etc., for sheets, molded products, etc. At this time, the diene polymer of the present invention enables a high ratio of coupled polymer chains and, further, resistance to scission of the coupled polymer chains, resulting in an excellent processability, low reduction of physical properties during processing, and excellent strength and other properties of the obtained product.

EXAMPLES

Below, specific embodiments of the present invention will be shown by way of examples. These examples are for the purpose of explaining in detail the gist of the present invention and, of course, the present invention is not intended to be limited by these examples.

Example 1

Two reaction vessels having an inner capacity of 10 liters and a ratio of length to depth (L/D) of 4, equipped with stainless steel mixers and jackets, were connected in series and used for continuous copolymerization with monomers of 1,3-butadiene and styrene (82/18 weight ratio), a solvent of n-hexane, a catalyst of n-butyl lithium in a ratio (phm) of 0.048 g per 100 g of the monomers, and an allene compound of 1,2-butadiene in a rate of 0.7 mole per mole of catalyst. The monomers were placed in a 22 percent by weight solution of n-hexane. The 1,3-butadiene solution, in which was mixed 1,2-butadiene, was divided into 1:2:7 proportions and supplied from positions two-thirds and one-third of the vertical length from the bottom of the reaction vessels and from the bottom position, respectively, with other substances all supplied from the bottom, by a constant volume pump for an average residence time of 40 minutes. In the first vessel, the internal temperature was controlled to 125° C. by the jacket. The polymerization rate at the outlet of the first vessel was determined by gas chromatography, whereupon it was found that the polymerization rate of the butadiene was 99 percent and the polymerization rate of the styrene was 96 percent.

The Mooney viscosity (ML-I) was determined by a Mooney viscometer, and was found to be $ML_{1+4}^{100°\,C.}$ 85.

Next, the polymerization solution was introduced continuously into the second vessel. In the second vessel, 0.065 phm of tetraglycidyl-1,3-bisaminomethylcyclohexane (0.95 equivalent of feed catalyst) was continuously added and the internal temperature controlled to 100° C., under which conditions the coupling reaction was promoted.

To the polymerization solution from the second vessel outlet was added an antioxidant of 2,4-ditertiarybutyl-p-cresole and 37.5 phr of aromatic oil, after which steam stripping was performed to remove the catalyst and drying was performed by rollers heated to 110° C. to obtain an oil extended polymer. This was used as evaluation material A.

The Mooney viscosity of the polymer after the coupling reaction (ML-C), sampled at the outlet of the second vessel, was $ML_{1+4}^{100°\,C.}$ 150. The Mooney viscosity of the oil extended polymer (OEML) was $ML_{1+4}^{100°\,C.}$ 65.

The amount of bonded styrene of the obtained polymer and the content of 1,2-vinyl of the butadiene portion were determined by the Hampton method using an infrared spectrophotometer, whereupon values of bonded styrene of 17.5 percent by weight and a content of 1,2-vinyl of the butadiene portion of 11 percent were obtained. The molecular weight and molecular weight distribution were calculated by GPC using a calibration curve of a polymer of standard polystyrene, and values of $\overline{Mw}$ of 720,000 and $\overline{Mw}/\overline{Mn}$ of 2.3 were found. Further, the GPC curve showed one peak of distribution of molecular weight. The homostyrene of the ozone decomposed products found by GPC was 68 percent by weight with respect to the total styrene and the long-chain block styrene was 12 percent by weight.

Next, the evaluation specimen A was used as the rubber stock and (IA): 90 mg/g, (DBP): 119 ml/100 g N339 carbon black was used in the recipe shown in Table 1 to obtain a formulation by method B of the standard compounding and mixing procedures of ASTM-D-3403-75 using a Banbury mixer for test use of an internal capacity of 1.7 liters. This was vulcanized and the physical properties thereof determined. The determination was made by the following methods:

(1) Tensile strength: According to JIS-K-6301

(2) Resilience: Rupke method according to JIS-K-6301, however, the resilience at 70° C. was determined by preheating the specimen in a 70° C. oven for one hour, then removing it quickly.

(3) Goodrich heat build-up: A goodrich flexometer was used and a test carried out under the conditions of a load of 24 pounds, a displacement of 0.225 inch, a start of 50° C., and a speed of 1800 rpm. The difference in the rise in temperature after 20 minutes was expressed.

(4) Wet skid resistance: A Stanley London portable skid tester was used and a safety walk (made by 3M) used as the road surface, with the determination made according to the method of ASTM-E-808-74. The values were shown by indices using the values determined for a standard composition as 100. The physical properties are shown in Table 3.

TABLE 1

| Evaluation Recipe | |
|---|---|
| Oil extended polymer | 137.5 parts |
| Aromatic oil | 7.5 parts |
| N-339 carbon black | 80 parts |
| Zinc oxide | 5 parts |
| Stearic acid | 2 parts |
| Antidegradant 810 NA | 1 part |
| Accelerator NS | 1.4 parts |
| Sulfur | 2 parts |

Comparative Examples (1-1) to (1-4)

The specimens for evaluation were prepared by the same method as in Example 1, except for the items shown in Table 2. The obtained rubbers were designated as evaluation specimens B to E.

Evaluation specimens B to E were used to obtain formulations by the same method as in Example 1. These were vulcanized and their physical properties determined. The physical properties are shown in Table 3.

Example 2

Using the same apparatus as in Example 1, continuous polymerization was performed using a monomer of 1,3-butadiene, a catalyst of n-butyl lithium at a rate (phm) of 0.050 g per 100 g monomer, and an allene compound of 1,2-butadiene in an amount of 0.9 mole per mole of catalyst.

The monomer was a 20 percent by weight solution of n-hexane. The monomer, catalyst, etc., were all supplied by a constant volume pump from the bottom of the reaction vessel for an average residence of 40 minutes. In the first vessel, the internal temperature was controlled by the jacket to be 135° C. The polymerization rate at the outlet of the first vessel was determined by gas chromatography, and a butadiene polymerization rate of 99 percent was obtained. The Mooney viscosity (ML-I) was determined by a Mooney viscometer and was found to be $ML_{1+4}^{100°\,C.}$ 90. The Mw, measured by GPC, was 520,000.

The polymerization solution was introduced continuously into the second vessel. At the second vessel, 0.070 phm tetraglycidylmetaxylenediamine (1.0 equivalent of feed catalyst) was continuously added and the internal temperature was controlled to 100° C. for the coupling reaction. To the polymerization solution 2,4-ditertiarybutyl-p-cresole as an antioxidant and 37.5 phr of aromatic oil was added from the outlet of the second vessel, then stream stripping was applied to remove the catalyst and drying was performed by hot rollers at 100° C., thus obtaining the oil extended polymer. This was designated as the evaluation specimen F. The analysis values of the polymer are shown in Table 2.

Using evaluation specimen F, a formulation was obtained by the same method as in Example 1. This was vulcanized and the physical properties evaluated. The physical properties are shown in Table 3.

Comparative Examples (2-1) to (2-2)

The specimens for evaluation were produced by the same method as in Example 2, except for the items shown in Table 2. The obtained rubbers were designated as evaluation specimens G to H.

From Table 2, it will be clear that, comparing the example of the present invention, i.e., Example 1 of a styrene butadiene random copolymer obtained using a tetrafunctional compound including two diglycidylamino radicals in a molecule, and Comparative Examples 1-1, 1-2, obtained using a conventional tetrafunctional coupling agent, Example 1 of the present invention has the highest ML-C and OEML and highest coupling efficiency. Comparative Example 1-3 is a coupling agent with an average 7.5 function and has the highest ML-C and OEML, but has a wide distribution of molecular weight, with no rise in the average molecular weight.

Example 2 and Comparative Examples (2-1) and (2-2) are polybutadiene examples and give the same results as with the above-mentioned styrene-butadiene copolymers.

From Table 3, it will be clear that the example of the present invention, i.e., specimen A of the styrenebutadiene random copolymer obtained by coupling by a specific polyfunctional compound, is extremely excellent in tensile strength, high temperature resilience, and heat build-up properties compared with the comparative examples, i.e., specimens B to E, due to the balance in processability and wet skid performance. Further, the example of the present invention, i.e., specimen F of polybutadiene, similarly has extremely excellent performance compared with the comparative examples, i.e., specimens G to H.

From the results of the above examples and comparative examples, the diene polymer of the present invention has a superior performance compared with polymers obtained by conventional methods, including, for example, a balanced processability. Vulcanized rubber using the diene polymer of the present invention is suitable for tire applications, in particular tire treads, and thus has great industrial significance.

TABLE 2

| | Ex. 1 | Comp. Ex. 1-1 | Comp. Ex. 1-2 | Comp. Ex. 1-3 | Comp. Ex. 1-4 | Ex. 2 | Comp. Ex. 2-1 | Comp. Ex. 2-2 |
|---|---|---|---|---|---|---|---|---|
| Feed monomer composition Bd/St Weight ratio | 82/18 | 82/18 | 82/18 | 82/18 | 82/18 | 100/0 | 100/0 | 100/0 |
| ML-1 ($ML^{100°\,C.}_{1+4}$) | 85 | 85 | 85 | 85 | 85 | 90 | 90 | 90 |
| Polyfunctional compound | Tetraglycidyl-1,3,-bisaminomethyl cyclohexane | Silicon tetrachloride | Adipic acid diethyl | Epoxidized*(1) liquid polybetadiene | Not used | Tetraglycidyl-metaxylene-diamine | Silicon tetrachloride | Adipic acid diethyl |
| Polyfunctional compound feed (phm) | 0.065 | 0.030 | 0.036 | 0.171 | — | 0.070 | 0.033 | 0.039 |
| Same as above (equivalent/catalyst) | 0.95 | 0.95 | 0.95 | 0.95 | — | 1.0 | 1.0 | 1.0 |
| ML-C ($ML^{100°\,C.}_{1+4}$) | 150 | 145 | 129 | 152 | — | 150 | 142 | 125 |
| OEML ($ML^{100°\,C.}_{1+4}$) | 65 | 63 | 55 | 67 | 38 | 67 | 63 | 55 |
| Bonded styrene (wt %) | 17.5 | 17.5 | 17.5 | 17.5 | 17.5 | | | |
| Mw (× 10$^4$) | 72 | 70 | 65 | 68 | 46 | 78 | 75 | 68 |
| Mw/Mn | 2.3 | 2.3 | 2.3 | 2.7 | 2.1 | 2.4 | 2.4 | 2.6 |

TABLE 2-continued

|  | Ex. 1 | Comp. Ex. 1-1 | Comp. Ex. 1-2 | Comp. Ex. 1-3 | Comp. Ex. 1-4 | Ex. 2 | Comp. Ex. 2-1 | Comp. Ex. 2-2 |
|---|---|---|---|---|---|---|---|---|
| Evaluation specimen | A | B | C | D | E | F | G | H |

*(1) Epoxidized liquid polybutadiene, average molecular weight 1800, oxirane oxygen content 6.5 wt %, average oxirane oxygen addition rate 7.5 mole/mole

TABLE 3

| Specimen | A | B | C | D | E | F | G | H | SBR1712 |
|---|---|---|---|---|---|---|---|---|---|
| Formulation Mooney viscosity $ML^{100°\,C.}{}_{1+4}$ | 92 | 86 | 83 | 89 | 67 | 97 | 91 | 89 | 52 |
| Rollability | Excellent | Excellent | Excelent | Excellent | Good | Good | Good | Good | Good |
| Tensile Strength kgf/cm$^2$ | 233 | 228 | 225 | 225 | 210 | 195 | 185 | 190 | 230 |
| Rupke resilience (room temperature) % | 42 | 41 | 42 | 41 | 41 | 45 | 44 | 44 | 32 |
| Rupke resilience (70° C.) % | 58 | 56 | 56 | 57 | 54 | 60 | 57 | 56 | 51 |
| Goodrich heat build-up (50° C.) ΔT° C. | 32 | 35 | 35 | 34 | 38 | 31 | 36 | 36 | 41 |
| Wet skid resistance index | 88 | 87 | 87 | 86 | 86 | 73 | 73 | 73 | 100 |

Example 3 and Comparative Example 3

(Preparation of Specimen 3-A)

Two reaction vessels having an inner capacity of 10 liters, equipped with mixers and jackets, were connected in series. Using a constant volume pump, the following were continuously fed from the bottom of the first reaction vessel: 21 g/min of butadiene, 9 g/min of styrene, 120 g/min of cyclohexane, 0.027 g/min of tetramethylethyleneamine as a polar compound, and 0.0105 g/min of n-butyl lithium as a catalyst. The internal temperature of the polymerization vessel was maintained at 105° to 110° C. The polymerization solution was continuously taken out from the head of the polymerization vessel and supplied to the second reaction vessel. The second reaction vessel was supplied with 0.0148 g/min of tetraglycidylmetaxylenediamine, corresponding to 0.9 equivalent of a mole of the active polymer, to cause the coupling reaction. The Mooney viscosity of the polymer before coupling ($ML_{1+4}$, I, 100° C.), obtained from the first vessel after stabilization of the polymerization reaction, was 90, and the Mooney viscosity after coupling ($ML_{1+4}$, C, 100° C.) was 160. To the polymerization solution after coupling was added 37.5 parts by weight of aromatic oil and 1 part by weight of BHT, per 100 parts of polymer, then the catalyst was removed. The Mooney viscosity of the obtained oil-extended polymer (specimen 3-A) ($ML_{1+4}$, OE, 100° C.) was 62, the styrene content was 30 percent by weight, and the microstructure of the butadiene portion was 29 percent cis-1,4 bonds, 41 percent trans-1,4 bonds, and 30 percent vinyl bonds. Further, the glass transition temperature by DSC was −42° C., and the distribution of molecular weight (Mw/Mn), determined by GPC, was 2.3. Further, the GPC curve showed one peak in the distribution of molecular weight. The homostyrene, found by GPC, of the ozone decomposition products, was 72 percent by weight with respect to the total styrene, and the long-chain block styrene was 0.5 percent by weight.

Note that the determination of the glass transition temperature by DSC was made by a rising temperature determination of 10° C./min.

(Preparation of Specimen 3-B)

A 30 liter reaction vessel equipped with a mixer and jacket was fed with 2,520 g of butadiene, 1,080 g of styrene, 14,400 g of cyclohexane, and 50 g of tetrahydrofuran. The temperature was kept at 40° C. Then, 1.44 g of n-butyl lithium was added as a catalyst and the polymerization initiated. After the completion of the polymerization, 1.43 g of tetraglycidyl-1,3-bisaminocyclohexane, or 0.7 equivalent of the active polymer was added as a coupling agent and the coupling reaction started. The Mooney viscosity of the polymer before coupling $ML_{1+4}$, I, 100° C.) was 85, the Mooney viscosity after coupling ($ML_{1+4}$, C, 100° C.) was 117, and the Mooney viscosity of the oil-extended polymer after addition of 37.5 phr of aromatic oil $ML_{1+4}$, OE, 100° C.) was 5.3. The styrene content of the obtained polymer (specimen 3-B) was 30 percent by weight, and the microstructure of the butadiene portion was 31 percent cis-1,4 bonds, 40 percent trans-1,4 bonds, and 31 percent vinyl bonds.

Further, the specimens (3-C) to (3-J) shown in Table 4 were obtained by the same polymerization method as that for obtaining the specimen 3-A or specimen 3-B. Their characteristics are shown in Table 4.

Among the specimens shown in Table 4, specimens (3-A), (3-B), (3-F), (3-H), and (3-J) are polymers falling in the scope of the present invention, while specimens (3-C) to (3-E) and specimen (3-G) are polymers for comparative purposes. Specimens L and M are polymers available commercially.

Note that specimens (3-C) and (3-D) are obtained by coupling methods outside the scope of the present invention, specimen (3-E) is a polymer obtained without a coupling reaction, specimen (3-G) is one in which TGAMH was supplied in an amount of 0.07 equivalent of the feed lithium, and specimen (3-J) is that in which TGAMH was supplied in an amount of 0.4 equivalent of the feed lithium.

Next, the recipes shown in Table 5 were kneaded by a Banbury mixer, then vulcanized by a vulcanization press at 160° C. for 20 minutes to obtain test pieces. The processability of the formulation and the vulcanizate properties were determined, whereupon the results shown in Table 6 were obtained. Note that the various measurements made in the examples and comparative examples were performed by the following methods. For those where no special mention is made, the same procedures as in Example 1 were followed.

TABLE 5

| Oil extended polymer | 137.5 parts |
|---|---|
| Aromatic oil | 12.5 parts |
| Carbon black N220*1 | 85 parts |
| Zinc oxide | 5 parts |

TABLE 4

| | Ex. | | Comp. Ex. | | | Ex. | Comp. Ex. | Ex. | | Comp. Ex. | |
|---|---|---|---|---|---|---|---|---|---|---|---|
| | 3-1 Spec. 3-A | 3-2 Spec. 3-B | 3-1 Spec. 3-C | 3-2 Spec. 3-D | 3-3 Spec. 3-E | 3-3 Spec. 3-F | 3-4 Spec. 3-G | 3-4 Spec. 3-H | 3-5 Spec. 3-J | 3-5 Spec. L | 3-6 Spec. M |
| Mooney viscosity after coupling ($ML_{12+4}$, C) | 160 | 117 | 150 | 168 | — | 110 | 107 | 90 | 140 | — | — |
| Mooney viscosity before coupling ($ML_{1+4}$, I) | 90 | 85 | 90 | 85 | 120 | 40 | 90 | 60 | 104 | — | — |
| $ML_{1+4}$, C/$ML_{1+4}$, I | 1.78 | 1.38 | 1.67 | 1.82 | — | 2.75 | 1.18 | 1.50 | 1.35 | — | — |
| Polyfunctional compound | TGMDA | TGAMH | SiCl$_4$ | EPB | — | TGMDA | TGAMH | TGMDA | TGAMH | — | — |
| Styrene content (wt %) | 30 | 30 | 30 | 30 | 30 | 31 | 30 | 30 | 40 | 35 | 23.5 |
| Vinyl bonds of butadiene portion (%) | 30 | 31 | 30 | 31 | 30 | 30 | 29 | 30 | 18 | 16 | 16 |
| Mw/Mn | 2.3 | 1.6 | 2.4 | 2.8 | 2.1 | 2.5 | 2.0 | 2.4 | 2.6 | 3.1 | 3.2 |
| Oil-extended Mooney viscosity (oil 37.5 phr) | 62 | 53 | 61 | 69 | 50 | 47 | 49 | 40 | 55 | 52 | 47 |

TGMDA: Tetraglycidylmetaxylenediamine
TGAMH: Tetraglycidyl-1,3-bisaminomethylcyclohexane
SiCl$_4$: Silicon Tetrachloride
EPB: Epoxidized liquid polybutadiene

Test Method

Rollability: Test-use 6-inch rolls were used and determination made by the wrapability on the roll and the ease of working. The roll temperature was 60° C. and the speed ratio 1:12. A indicates the best case and D the worst. Cases of buckling and cases where the stickiness was severe and the operation difficult were designated as D.

JIS resilience: Determined according to JIS-K-6301 with heating of the specimen to 60° C.

Wear resistance: Determined using a Pico wear tester. Expressed as an index using a standard composition as 100.

−10° C. headness: Determined using a JIS-A hardness meter.

| Stearic aicd | 2 parts |
|---|---|
| Antidegradant 810 NA | 1 part |
| Wax | 2 parts |
| Vulcanization accelerator CZ | 1.2 parts |
| Sulfur | 2.4 parts |
| Total | 248.6 parts |

*1 Carbon black N220 with an iodine adsorption of 121 mg/g and a dibutylphthalate oil adsorption of 114 ml/100 g

TABLE 6

| Specimen name | Ex. 3-1 Spec. 3-A | Ex. 3-2 Spec. 3-B | Comp. Ex. 3-1 Spec. 3-C | Comp. Ex. 3-2 Spec. 3-D | Comp. Ex. 3-3 Spec. 3-E | Ex. 3-3 Spec. 3-F | Comp. Ex. 3-4 Spec. 3-G | Ex. 3-4 Spec. 3-H | Ex. 3-5 Spec. 3-J | Comp. Ex. 3-5 Spec. L | Comp. Ex. 3-6 Spec. M |
|---|---|---|---|---|---|---|---|---|---|---|---|
| Formulation Mooney viscosity ($ML_{1+4}$, 100° C.) | 83 | 80 | 78 | 83 | 80 | 74 | 89 | 75 | 85 | 77 | 73 |
| Roolability | A | A | D | C | C | A | D | A | B | C | B |
| Tensile strenght (kgf/cm$^2$) | 220 | 223 | 221 | 225 | 213 | 210 | 225 | 213 | 225 | 230 | 225 |
| JIS resilience (60° C., %) | 43 | 44 | 42 | 41 | 41 | 42 | 42 | 42 | 44 | 41 | 43 |
| Wet skid resistance (index)*1 | 108 | 108 | 108 | 106 | 108 | 108 | 106 | 107 | 107 | 108 | 100 |
| Goodrich heat build-up (ΔT, °C.) | 44 | 43 | 46 | 44 | 43 | 46 | 45 | 47 | 45 | 47 | 47 |
| Wear resistance (index)*2 | 85 | 86 | 79 | 84 | 78 | 75 | 80 | 80 | 86 | 85 | 100 |

*1, *2 The wet skid resistance wear resistance are indicated as indices using the measured values of Comparative Example 3-6 as 100. The larger the figures, the better the resistance.

From the results of Table 6, it will be clear that to make a composition having excellent processability and superior vulcanizate properties, it is necessary to limit the coupling reaction shown in the present invention and limit the polymer structure. When specimens not satisfying the above were used, defects in performance were found.

Example 4 and Comparative Example 4

Using specimens N to S shown in Table 7, which fall in the scope of the present invention, specimen V, for comparative purposes, and specimens L and M shown in Table 4, the vulcanizates of the recipe shown in Table 8 were prepared. The processability was judged and the vulcanizate properties determined, giving the results shown in Table 9. From the results, it is clear that use of specimens in the scope limited by the present invention gives a composition with a better balance of processability and vulcanizate properties and greater suitability for tire treads compared with the conventional specimens with the same wet skid resistance.

TABLE 8

| | |
|---|---|
| Oil-extended polymer | 137.5 parts |
| Aromatic oil | 2.5 parts |
| Carbon black N339*2 | 75 parts |
| Zinc oxide | 3 parts |
| Stearic acid | 2 parts |
| Antidegradant 810 NA | 1 parts |
| Vulcanization accelerator NS | 1.4 parts |
| Sulfur | 2 parts |
| Total | 224.4 parts |

*2 Carbon black N339.: iodine adsorption of 90 mg/g and a dibutylphthalate oil absorption of 120 ml/100 g

TABLE 9

| | Ex. 4-1 | Ex. 4-2 | Ex. 4-3 | Ex. 4-4 | Ex. 4-5 | Ex. 4-6 | Comp. Ex. 4-1 | Comp. Ex. 4-2 | Comp. Ex. 4-3 |
|---|---|---|---|---|---|---|---|---|---|
| Specimen name | Spec. N | Spec. O | Spec. P | Spec. Q | Spec. R | Spec. S | Spec. L | Spec. M | Spec. M/V |
| Formulation Mooney viscosity ($ML_{1+4}$, 100° C.) | 82 | 84 | 75 | 78 | 77 | 88 | 57 | 57 | 60 |
| Rollability | A | A | B | A | C | C | B | A | A |
| Tensile strength (kgf/cm$^2$) | 235 | 226 | 242 | 220 | 240 | 197 | 245 | 240 | 215 |
| JIS resilience (60° C., %) | 59 | 61 | 50 | 56 | 46 | 63 | 49 | 51 | 58 |
| Wet skid resistance (index)*1 | 101 | 90 | 108 | 105 | 110 | 83 | 108 | 100 | 90 |
| Goodrich heat build-up ($\Delta T$, °C.) | 35 | 34 | 37 | 35 | 40 | 35 | 39 | 38 | 37 |
| Wear resistance (index)*2 | 95 | 140 | 83 | 83 | 69 | 150 | 80 | 100 | 135 |
| −10° C., hardness (JIS-A) | 75 | 70 | 85 | 75 | 94 | 68 | 84 | 78 | 72 |
| Remarks | | | | | | | | | M/V = 70/30 |

*1, *2 The wet skid resistance and wear resistance are indicated as indices using the measured values of Comparative Example 4-2 as 100. The larger the figures, the better.

Example 5 and Comparative Example 5

Using the blends of rubbery polymers shown in Table 10, compositions were obtained by the same method as in Example 3, the processability and vulcanizate properties were measured, and the results shown in Table 10

TABLE 7

| | Ex. 4-1 Spec. N | Ex. 4-2 Spec. O | Ex. 4-3 Spec. P | Ex. 4-4 Spec. Q | Ex. 4-5 Spec. R | Ex. 4-6 Spec. S | Commercially available polymers | | | |
|---|---|---|---|---|---|---|---|---|---|---|
| | | | | | | | Spec. U | Spec. V | Spec. X | Spec. Y |
| Mooney viscosity after coupling ($ML_{1+4}$, C) | 130 | 132 | 128 | 135 | 125 | 130 | — | — | — | — |
| Mooney viscosity before coupling ($ML_{1+4}$, I) | 80 | 77 | 85 | 76 | 88 | 79 | 52 | — | 65 | 45 |
| $ML_{1+4}$, C/$ML_{1+4}$, I | 1.63 | 1.71 | 1.51 | 1.78 | 1.42 | 1.65 | — | — | — | — |
| Polyfunctional compound | TGMDA | TGMDA | TGMDA | TGMDA | TGMDA | TGMDA | — | — | — | — |
| Styrene content (wt %) | 25 | 17 | 40 | 20 | 52 | 3 | 23.5 | 0 | — | 0 |
| Vinyl bonds of butadiene portion (%) | 20 | 10 | 13 | 38 | 15 | 30 | 16 | 13 | — | — |
| Mw/Mn | 2.5 | 2.3 | 2.6 | 2.1 | 2.5 | 2.4 | 3.2 | 2.5 | — | 2.8 |
| Oil-extended Mooney viscosity (oil 37.5 phr) | 54 | 57 | 50 | 51 | 48 | 56 | — | 40 | — | — |
| Remarks | | | | | | | Emulsion Polymerization, non-oil extended SBR*1 | Low cis oil extended BR*2 | Natural rubber RSS No. 3 | High cis BR*3 |

*1 SBR 1502 (Japan Synthetic Rubber Co., Ltd.)
*2 Diene 531 (Asahi Chemical Industry Co., Ltd.)
*3 JSR BR 01 (Japan Synthetic Rubber Co., Ltd.)

were obtained. For specimens 3-A, L, and M, see Table 4 and for specimens N, O, U. X, and Y, see Table 7.

As shown in Table 10, use of the polymers limited by the present invention in the predetermined ranges gives compositions with an excellent balance of processability and vulcanization properties.

TABLE 10

|  | Ex. 5-1 | Comp. Ex. 5-1 | Ex. 5-2 | Comp. Ex. 5-2 | Ex. 5-3 | Comp. Ex. 5-3 | Ex. 5-4 | Comp. Ex. 5-4 | Comp. Ex. 5-6 |
|---|---|---|---|---|---|---|---|---|---|
| Formulation | 3-A | L | N | M | N | M | O | M | U |
| Polymer (I) |  |  |  |  |  |  |  |  |  |
| Specimen name |  |  |  |  |  |  |  |  |  |
| Polymer (II) Weight (parts) | 96.25 | 96.25 | 60 | 60 | 40 | 40 | 80 | 60 | 100 |
| Specimen name | V | V | X | X | X | X X | X | — |  |
| Polymer (III) Weight (parts) | 30 | 30 | 20 | 20 | 40 | 40 | 20 | 20 | — |
| Specimen name | — | — | Y | Y | U | U | — | V | — |
| Weight (parts) | — | — | 20 | 20 | 20 | 20 | — | 20 | — |
| Carbon black N339 | 70 | 70 | 65 | 65 | 60 | 60 | 70 | 70 | 65 |
| Aromatic oil | 3.75 | 3.75 | 2.5 | 2.5 | 5 | 5 | 0 | 7.5 | 25 |
| Formulation performance |  |  |  |  |  |  |  |  |  |
| Rollability | A | C | A | B | A | A | A | A | A |
| Tensile strength (kgf/cm$^2$) | 245 | 253 | 257 | 263 | 272 | 276 | 240 | 243 | 240 |
| JIS resilience (70° C., %) | 59 | 55 | 65 | 60 | 61 | 58 | 63 | 59 | 55 |
| Wet skid resistance (index)*2 | 103 | 103 | 90 | 90 | 94 | 93 | 91 | 91 | 100 |
| Goodrich heat buil-up (ΔT, °C.) | 35 | 39 | 32 | 35 | 34 | 37 | 35 | 38 | 40 |
| Wear resistance (index)*2 | 103 | 103 | 140 | 140 | 120 | 116 | 150 | 144 | 100 |

*1 Other compounded ingredients
Zinc oxide 3 parts
Stearic acid 2 parts
Antidegradant 810NA 1 part
Sulfur 1.8 parts
Vulcanization accelerator CZ 1.2 parts
*2, *3 The wet skid resistance and wear resistance are indicated as indices using the measured values of Comparative Examples 5-6 as 100. The larger the figures, the better the resistance.

Example 6 and Comparative Example 6

Compositions containing large amounts of carbon black and oil, shown in Table 11, were obtained and their processability and vulcanizate properties evaluated, giving the results shown in Table 12.

From the results of Table 12, it is clear that use of the polymers limited by the present invention gives rubber compositions having an excellent processability and vulcanization properties.

TABLE 11

| Oil-extended polymer | 137.5 parts |
|---|---|
| Aromatic oil | 42.5 parts |
| Carbon black N110*3 | 100 parts |
| Zinc oxide | 5 parts |
| Stearic acid | 3 parts |
| Antidegradant 810 NA | 2 parts |
| Vulcanization accelerator CZ | 1.8 parts |
| Sulfur | 2.5 parts |
| Total | 294.3 parts |

*3 Carbon black N110: iodine adsorption of 145 mg/g and a dibutylphthalate oil adsorption of 113 ml/100 g

TABLE 12

|  | Ex. 6-1 | Ex. 6-2 | Comp. Ex. 6-1 | Comp. Ex. 6-2 |
|---|---|---|---|---|
| Specimen name | Spec. 3-A | Spec. 3-B | Spec. L | Spec. M |
| Formulation Mooney viscosity (ML$_{1+4}$, 100° C.) | 55 | 52 | 42 | 42 |
| Tensile strength (kgf/cm$^2$) | 186 | 183 | 192 | 195 |
| JIS resilience (60° C., %) | 41 | 40 | 37 | 38 |
| Wet skid resistance (index)*1 | 108 | 108 | 107 | 100 |
| Goodrich heat build-up (ΔT, °C.) | 42 | 41 | 48 | 45 |
| Wear resistance (index)*2 | 82 | 82 | 85 | 100 |
| −10° C., hardness (JIS-A) | 83 | 83 | 88 | 84 |
| Rollability | A | A | D | B |

*1, *2 The wet skid resistance and wear resistance are indicated as indices using the measured values of Comparitive Example 6-2 as 100. The larger the figures, the better the resistance.

Example 7

Polybutadiene was produced in the same way as in Example 2. However, the continuous polymerization was performed with a rate of 0.20 g of n-butyl lithium as the catalyst, per 100 g of the monomer, and using 0.18 mole, per mole of catalyst, of 1,2-butadiene. The monomer was in a 15 percent by weight n-hexane solution and the internal temperature at the first vessel was controlled to 100° C.

Further, the polymerization solution was introduced continuously into the second vessel. At the second vessel, 0.229 phm (0.8 equivalent of feed catalyst) of tetraglycidyl-1,3-bisaminomethylcyclohexane was continuously added and the internal temperature controlled to 100° C. for the coupling reaction. To the polymerization solution obtained from the outlet of the second vessel was added as an antioxidant 2,4-ditertiary-butyl-p-cresol. The solvent was removed by heating and distillation and the polymer thus obtained. This was used as evaluation specimen I.

The Mooney viscosity of the obtained polymer (ML-C) was ML$_{1+4}$$^{100°}$ $^{C.}$ 35, and the 5 percent by weight styrene solution viscosity at 25° C. (SV) was 30 cps. The weight average molecular weight Mw by GPC was 120,000, and the molecular weight distribution $\overline{Mw}/\overline{Mn}$ was 2.1. The GPC curve displayed a single peak in the molecular weight distribution.

Next, this rubber was used as a stiffener and HIPS was produced by the bulk polymerization method described below.

Five parts by weight of the above-mentioned evaluation specimen I was dissolved in 95 parts by weight of styrene and 8 parts by weight of ethyl benzene. Further, 0.05 part by weight of benzoyl peroxide and 0.10 part by weight of a-methylstyrene dimer, based on styrene, were added, and the polymerization performed at 80° C. for 4 hours, 110° C. for 4 hours, and 150° C. for 4 hours, with mixing. Further, heat treatment was performed at around 230° C. for 30 minutes, then the unreacted styrene and ethyl benzene were vacuum removed and a polystyrene resin obtained. This was pulverized, then shaped into pellets by an extruder, injection molded, and the physical properties were measured. The results are shown in Table 14.

Comparative Example 7

The specimens for evaluation were prepared by the same method as in Example 7 except for the items indicated in Table 13. The obtained rubbers were designated as evaluation specimens 7-J to 7-L.

Using the evaluation specimens 7-J to 7-L, high impact polystyrene was prepared by the same method as in Example 7 and the physical properties determined. The physical properties are shown in Table 14.

From Table 14, it is found that the high impact polystyrene obtained using the example of the present invention, i.e., specimen I, has a superior balance of Izot impact strength, bending elasticity, and luster, and a particularly superior impact resistance, compared with high impact polystyrene obtained using the polybutadiene specimens 7-J to 7-L produced using polyfunctional compounds outside the present invention. Further, there was no corrosion of the dies at all upon injection molding of the high impact polystyrene obtained using the example of the present invention, i.e., specimen I.

thermoplastic elastomer, i.e., a block copolymer of a $(A-B)_4X$ structure containing 40 percent by weight of styrene, was obtained. This was designated as evaluation specimen 8-M.

Next, the physical properties were evaluated using the evaluation specimen 8-M. The evaluation results are shown in Table 15.

Comparative Example 8-1

A coupled polymer was produced in the same way as in Example 8 except for using silicon tetrachloride as the polyfunctional compound. The obtained polymer was designated as evaluation specimen 8-N. This was evaluated in the same way as Example 8, the results being shown in Table 15.

Comparative Example 8-2

A coupled polymer was produced in the same way as in Example 8 except for using adipic acid diethyl as the polyfunctional compound. The obtained polymer was designated as evaluation specimen 8-O. This was evaluated in the same way as Example 8, the results being shown in Table 15.

As clear from Table 15, the example of the present invention, i.e., specimen 8-M, was superior, particularly

TABLE 13

| | Ex. 7 | Comp. Ex. 7-1 | Comp. Ex. 7-2 | Comp. Ex. 7-3 |
|---|---|---|---|---|
| Feed catalyst (phm) | 0.20 | 0.20 | 0.17 | 0.14 |
| Polyfunctional compound | Tetraglycidyl-1,3-bisaminomethyl-cyclohexane | Silicon tetra-chloride | Adipic acid diethyl | Epoxidized soybean oil (1) |
| Polyfunctional compound feed rate (phm) | 0.229 | 0.106 | 0.134 | 0.729 |
| Same as above (equivalent/catalyst) | 0.8 | 0.8 | 1.0 | 1.0 |
| Mooney viscosity (ML(1+4, 100° C.) | 35 | 32 | 30 | 25 |
| Solution viscosity (cps) | 30 | 30 | 35 | 34 |
| $\underline{Mw}$ ($\times 10^4$) | 13 | 13 | 14 | 15 |
| Mw/Mn | 2.1 | 2.2 | 2.2 | 2.5 |
| Evaluation specimen | I | 7-J | 7-K | 7-L |

(1) ADK CIZER 0-130S: Calculated as average trifunction.

TABLE 14

| Specimen | 1 | 7-J | 7-K | 7-L |
|---|---|---|---|---|
| Rubber particle size (μ)*1 | 0.92 | 0.87 | 1.25 | 0.81 |
| Izot impact strength*2 | 8.3 | 6.7 | 8.5 | 5.5 |
| Bending elasticity*3 | 23000 | 22600 | 21600 | 22800 |
| Luster*4 | 95 | 98 | 75 | 101 |

*1 Determined by electron microscope, units of microns
*2 By JIS K-7110 (notched), units of kg.cm/cm
*3 By ASTM D-790, units of kg/cm²
*4 By JIS Z-8741 (angle of incidence 60° C.)

Example 8

In a stainless steel reaction vessel equipped with a mixer and jacket and under a nitrogen gas atmosphere, 0.35 part by weight of sec-butyl lithium was added to a cyclohexane solution including 40 parts by weight of styrene, whereupon polymerization was performed at 70° C. for 1 hour. Then, cyclohexane including 60 parts by weight of 1,3-butadiene was added and polymerization performed at 70° C. for 2 hours. The monomer was fed at a concentration of 25 percent by weight. Next, as a polyfunctional compound, tetraglycidylaminodiphenylmethane was fed in an amount of 1 equivalent (1/4 mole) of the feed catalyst and a reaction caused at 70° C. for 20 minutes. As an antioxidant, 0.7 part of 2,4-ditertiary-butyl-p-cresole (BHT) and 0.5 part of trisnonylphosphate (TNP) per 100 parts polymer were added. The solvent was distilled off by heating and a in tensile strength, to specimens 8-N and 8-O, produced using coupling reactions by polyfunctional compounds outside the present invention.

TABLE 15

| | Ex. 8 Spec. 8-M | Comp. Ex. 8-1 Spec. 8-N | Comp. Ex. 8-2 Spec. 8-O |
|---|---|---|---|
| Hardness (Hs (JIS)) | 90 | 89 | 87 |
| 300% Mo (kgf/cm²) | 50 | 47 | 40 |
| Tensile strength (kgf/cm²) | 280 | 240 | 205 |
| Elongation (%) | 800 | 750 | 730 |

Test piece: Compression molded sheet 2 mm (thickness)
Determination method: According to JIS K-6301

Example 9

In a stainless steel reaction vessel equipped with a mixer and jacket and under a nitrogen gas atmosphere, 0.30 part by weight of n-butyl lithium was added to a cyclohexane solution including 75 parts by weight of styrene, whereupon polymerization was performed at 70° C. for 1 hour. Then, cyclohexane including 25 parts by weight of 1,3-butadiene was added and polymerization performed at 70° C. for 2 hours. The monomer was fed at a concentration of 25 percent by weight. Next, as a polyfunctional compound, tetraglycidyl-1,3-bisaminomethylcyclohexane was fed in an amount of 1 equivalent (¼ mole) of the feed catalyst and a reaction caused at 70° C. for 20 minutes. As an antioxidant, 0.7 part of 2,4-ditertiary-butyl-p-cresole (BHT) and 0.5 part of trisnonylphosphate (TNP) per 100 parts polymer were added. The solvent was distilled off by heating and a thermoplastic elastomer, i.e., a block copolymer of a (A—B)₄X structure containing 75 percent by weight of styrene, was obtained. This was designated as evaluation specimen 9-P.

Next, the physical properties were evaluated using the evaluation specimen 9-P. In the evaluation of the physical properties, an Izot impact strength test was performed using test pieces obtained by injection molding. Further, a test of the workability was performed by a 30 mm extruder at a cylinder temperature of 200° C. The results are shown in Table 16.

Comparative Example 9

A coupled polymer was produced in the same way as in Example 9 except for using silicon tetrachloride as the polyfunctional compound. The obtained polymer was designated as evaluation specimen 9-Q. This was evaluated in the same way as Example 9, the results being shown in Table 16.

As clear from Table 16, the example of the present invention, i.e., specimen 9-P, had an extremely superior Izot impact strength to specimen 9-Q, produced using polyfunctional compounds outside the present invention, and further was extremely superior in the maintenance of the physical properties in the case of repeated kneading by an extruder. Further, the feature of a resistance to scission of the coupled polymer chains was displayed. Further, there was no corrosion at all of the dies during injection molding by the example of the present invention, i.e., specimen 9-P.

TABLE 16

|  | Ex. 9 Spec. 9-P | Comp. Ex. 9 Spec. 9-Q |
| --- | --- | --- |
| Izot impact strength (kgf·cm/cm) | 2.1 | 1.2 |
| Maintenance of Izot impact strength in rework test (%) | | |
| 5th reworking | 96 | 89 |
| 10th reworking | 93 | 84 |
| 20th reworking | 90 | 78 |
| Izot impact strength: According to JIS K7110 (notched) | | |

The diene polymer coupled by the specific polyfunctional compound of the present invention, as mentioned above, has the extremely excellent effect of an epoch-making improvement in processability and in strength, elasticity, etc., and non-generation of toxic, corrosive substances during the processing. Therefore, the diene polymer of the present invention may be very suitable for use, in applications for tires, primarily tire treads, in applications for stiffeners for high impact polystyrene, in applications for thermoplastic elastomers, in applications for thermoplastic plastic resins, primarily transparent, impact resistant resins, and in various other applications where conventional diene polymers are used, and thus has great industrial significance.

We claim:

1. A diene polymer expressed by the following general formula and with a weight average molecular weight, determined by GPC, of 10,000 to 1,000,000:

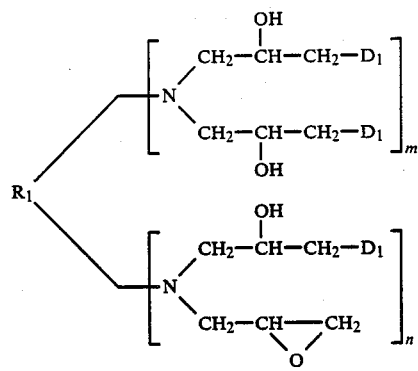

wherein $D_1$ is a diene polymer bonded via a carbon-carbon linkage, $R_1$ is an organic group of 1 to 20 carbon atoms free from active hydrogen or a silicon compound, m is 0 or an integer of from 1 to 6, and n is 0 or an integer of from 1 to 6; and when m is 1 or more n =0; and when n is 2 or more, m =0.

2. A diene polymer according to claim 1, wherein a diene polymer having lithium-carbon bonds is coupled by a polyfunctional compound containing diglycidylamino radicals, having a weight average molecular weight determined by GPC of 10,000 to 1,000,000, and wherein the ratio of the molecular weights before and after coupling is 1.2 or more.

3. The diene polymer according to claim 1, wherein said diene polymer is a conjugated diene polymer or a random copolymer of conjugated diene and a vinyl aromatic compound.

4. The diene polymer according to claim 1, wherein said diene polymer is a block copolymer of a vinyl aromatic compound and a conjugated diene.

5. The diene polymer according to claim 4, wherein said block copolymer of said vinyl aromatic compound and said conjugated diene is a thermoplastic elastomer.

6. The diene polymer according to claim 4, wherein said block copolymer of said vinyl aromatic compound and said conjugated diene is a thermoplastic resin.

7. A diene polymer composition which comprises 10 to 99 percent by weight of the diene polymer of claim 1 and 90 to 1 percent by weight of a diene polymer which corresponds to $D_1$ and having the general formula shown in claim 1.

8. A process for producing a diene polymer according to claim 1 which comprises:
coupling a polyfunctional compound containing diglycidylamino radicals to a diene polymer having lithium carbon bonds to produce said resultant diene polymer; and
wherein said resultant diene polymer has a weight average molecular weight determined by GPC of 10,000 to 1,000,000, and wherein the ratio of the molecular weights before and after coupling is 1.2 or more.

* * * * *